United States Patent [19]

Dodge

[11] Patent Number: 4,914,618
[45] Date of Patent: Apr. 3, 1990

[54] ASYNCHRONOUS SERIAL COMMUNICATIONS APPARATUS WITH VARIABLE LENGTH STOP BIT GENERATION CAPABILITY

[75] Inventor: Warren L. Dodge, Portland, Oreg.

[73] Assignee: Tektronix, Inc., Beaverton, Oreg.

[21] Appl. No.: 928,767

[22] Filed: Nov. 10, 1986

[51] Int. Cl.⁴ .............................................. G06F 5/06
[52] U.S. Cl. ................................. 364/900; 364/919; 364/939.4; 375/117
[58] Field of Search ... 364/200 MS File, 900 MS File; 375/117; 370/29

[56] References Cited

U.S. PATENT DOCUMENTS

| 4,210,777 | 7/1980 | Bowerman et al. | 364/200 |
| 4,509,164 | 4/1985 | Mouftah | 370/29 |
| 4,607,345 | 8/1986 | Mehta | 364/900 |
| 4,642,810 | 2/1987 | Picard | 364/900 |

*Primary Examiner*—Gareth D. Shaw
*Assistant Examiner*—Debra A. Chun
*Attorney, Agent, or Firm*—Allston L. Jones; Robert S. Hulse

[57] ABSTRACT

A method and apparatus is disclosed which provides for controlling a rate of transmission of information over a serial communications channel. Each unit of information transmitted has associated therewith a start bit and a plurality of stop bits. The number of stop bits is adjusted to provide a desired effective channel transmission rate. In an alternate embodiment the communication channel is held in a selected state subsequent to the transmission of each unit of information for a selected period of time prior to the transmission of a following unit of information. Consequently, while the actual rate of transmission of information over a communication channel remains constant, an effective rate of transmission may be varied in accordance with a desired rate of transmission.

16 Claims, 8 Drawing Sheets

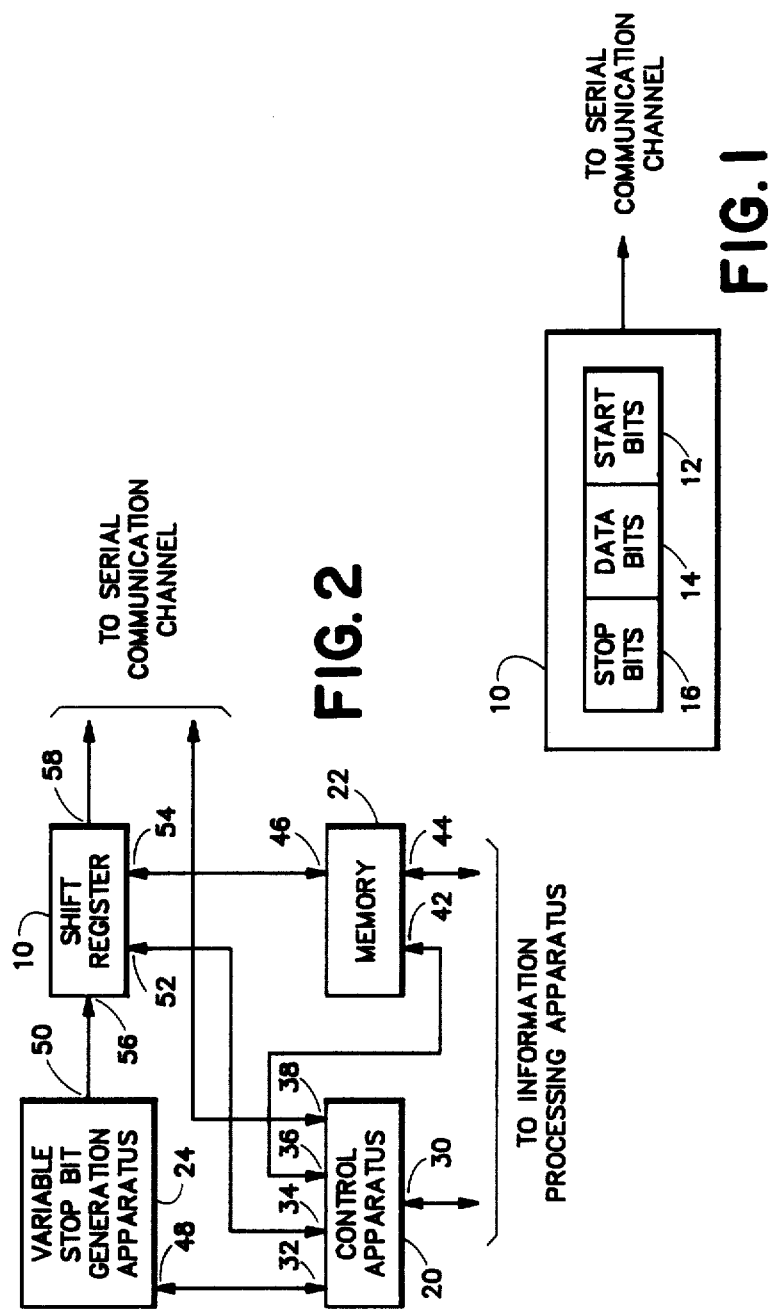

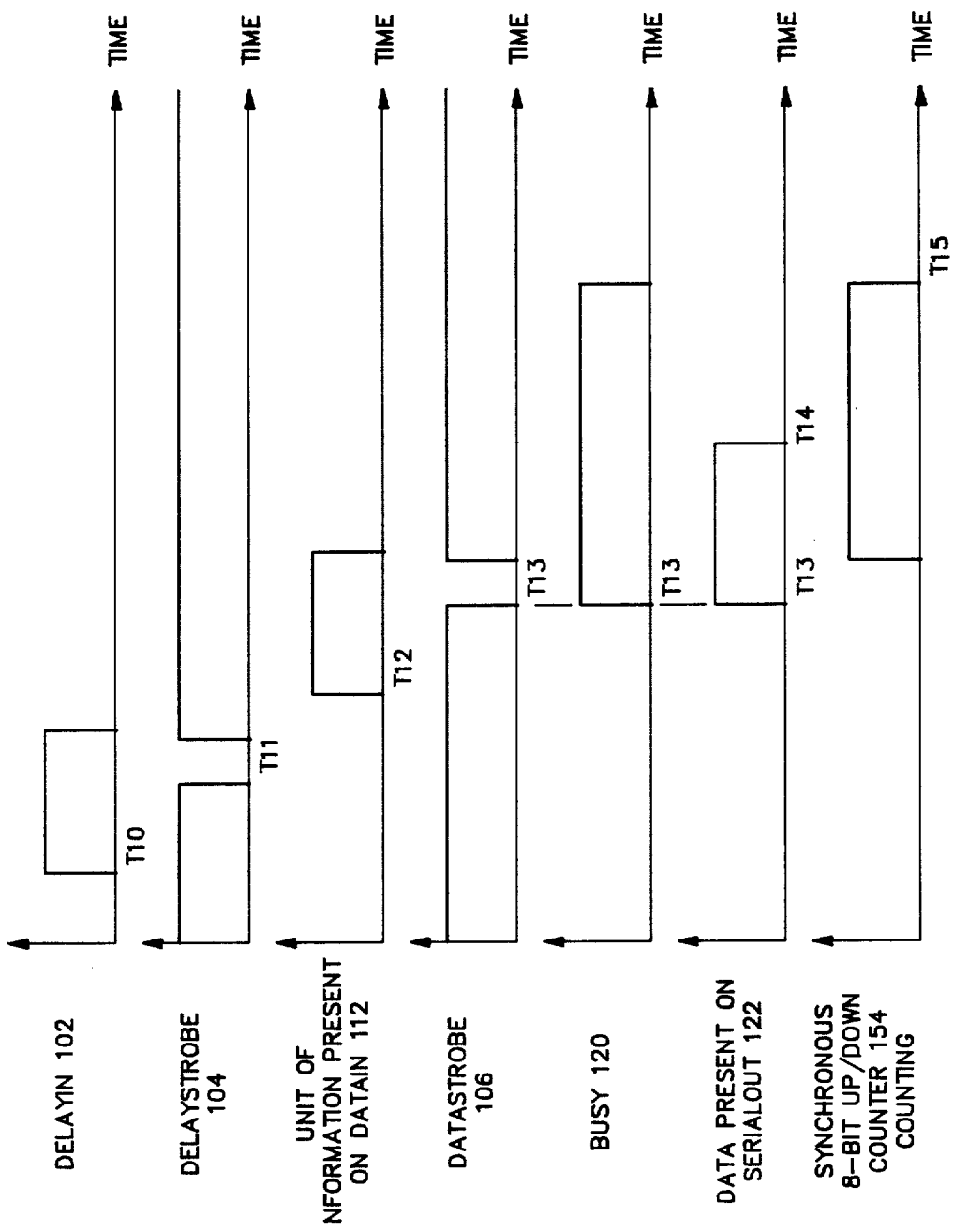

ASYNCHRONOUS SERIAL COMMUNICATIONS APPARATUS WITH VARIABLE LENGTH STOP BIT GENERATION CAPABILITY

BACKGROUND

This invention relates to the transfer of information between communication devices, and more particularly to control of the rate at which information is serially transferred between communication devices.

In an asychronous mode of transmission, groups of bits are transmitted on an individual basis, one bit at a time, at a preselected rate of transmission. The preselected rate of transmission must of course be known by both the transmitting and receiving apparatus. The receiving apparatus synchronizes with the transmitting apparatus on receipt of the first bit of each group of bits received. Thereafter, the state of the transmission channel is sampled at regular intervals to determine the state of each transmitted bit. The sampling interval is defined by the preselected rate of transmission.

The asychronous transmission of information typically operates in the following manner. A transmission channel generally may only assume one of two possible states, hereinafter referred to as a marking or spacing state. During an idle condition, i.e., when information is not being transmitted, the transmission channel is held in one of the two states, typically the marking state. When the transmitting apparatus begins the transmission of a group of bits, it must indicate such to the receiving apparatus, thereby allowing the receiving apparatus to synchronize thereto. This is accomplished by the transmitting apparatus sending a "start bit". The start bit functions to change the state of the transmission channel, i.e., from the marking to the spacing state. This serves to notify the receiving apparatus that information will follow, i.e., a group of bits will follow in a sequential fashion. When the receiving apparatus detects the change in state of the transmission channel, i.e., the occurrence of a start bit, it thereafter begins measuring intervals of time equal to the time for transmission of a single bit, and at the expiration of each of such intervals, determines the state of the transmission channel. In this manner, the receiving apparatus may determine the state of the bits which are transmitted.

While the foregoing broadly describes the asychronous transmission process, there are a number of considerations associated therewith. In particular, at the conclusion of the transmission of a group of bits, the transmission channel must be again returned to the idle state, i.e., the marking state. As the state of the last bit of the group of bits transmitted may or may not correspond to the desired idle state, e.g., the marking state, it is necessary to transmit an additional bit to ensure that the transmission channel is in fact returned to the desired idle state. This bit is referred to as a "stop bit".

Consequently, it is observed that each group of bits transmitted has associated therewith a start bit and a stop bit. Further additional bits may be included, e.g. a parity bit, as required by a particular application.

From the foregoing discussion, a number of significant considerations follow. First, the rate of transmission, i.e., frequency, defines the time period between the transmission of successive bits contained within a group of bits. As the time periods are measured by the receiving apparatus in a sequential fashion, beginning with the detection of the start bit, any difference in frequencies between the transmitting and receiving apparatus accumulates with the occurrence of each successive time period. As this time period is used to determine the time at which the state of the transmission channel is to be sensed by the receiving apparatus, a limitation exists on the number of time periods which may occur, i.e. the number of bits which may be transmitted, and correctly sensed by the receiving apparatus. As a practical matter there will typically be a finite difference between the frequency at which the transmitting and receiving apparatus operate. Consequently there will be a limit on the number of bits which may be successfully transferred between the transmitting and receiving apparatus before a cumulative error operates to effect the incorrect reading of information by the receiving apparatus. By way of illustration, assuming the transmitting apparatus is operating at a frequency which is 5% higher than the preselected frequency of transmission, and the receiving apparatus is operating at a frequency which is 5% lower than the preselected frequency, a total difference in frequency of 10% will exist between the transmitting and receiving apparatus. Consequently, subsequent to the receipt of a start bit, the receiving apparatus will determine the state of the transmission channel for the first bit at a point in time 10% later than expected. In a similar fashion, the receiving apparatus will determine the state of the transmission channel at a point 10% later than expected for the second bit, which is a total of 20% later with respect to the point in time indicated by the start bit. By the time a tenth bit i transmitted, the receiving apparatus will determine the state of the transmission channel at a point in time 100% later than expected, i.e., when the receiving apparatus is expecting to be determining the state of the transmission channel for the 10th bit, the transmission channel will in fact be transmitting the 11th bit. This will result in an error condition. Consequently, it is observed that a difference in frequencies between the transmitting and receiving apparatus operates in a cumulative fashion to limit the number of bits which may be successfully transmitted. It is therefore necessary in the asychronous method of transmission to re-synchronize the transmitting and receiving apparatus for each group of bits which are transmitted. This is accomplished by the occurrence of the start bit.

As the receiving apparatus is aware of the expected number of bits in each group of bits transmitted, and further expects the transmission channel to be returned to the idle condition subsequent to the transmission of the last bit within each group of bits, the receiving apparatus may check for the occurrence of the idle condition of the transmission channel, i.e., the stop bit. If the transmission channel is not in the expected idle condition subsequent to the receipt of the last bit of a group of bits, i.e., the marking state, then the receiving apparatus has an indication that an error condition exists.

As a practical matter, there will generally be a finite amount of error between the frequencies of the transmitting and receiving apparatus. As a consequence thereof, the length of the stop bit is frequently adjustable to accommodate for the aforedescribed potential difference in frequencies. While the amount by which the length of the stop bit may be adjusted varies among devices, lengths of 1, 1.5 and 2 bit periods are customary. As the minimum length of the required stop bit is directly determined by the difference in reference frequencies used by the respective transmitting and receiving apparatus, shorter length stop bits may be employed when the respective reference frequencies of the transmitting and receiving apparatus are closely matched. By employing stop bits of shorter length, an increase in the effective rate of transmission may be achieved.

In the past an approach based upon reducing the number of stop bits transmitted between successive characters by fractional amounts has been employed in attempts to shorten transmission times. In particular, the Model SCN2681 Dual Asychronous Receiver/Transmitter manufactured by Signetics Corporation of Sunnyvale, Calif., provides for the selection of 1, 1.5 or 2 stop bits in 1/16 bit increments. By employing such a technique, the amount of idle time between successive characters may be reduced to a minimal amount. Consequently, a higher effective transmission rate may be achieved by decreasing, in fractional amounts, the length of stop bits transmitted between successive characters.

In addition to the foregoing, there is a further practical consideration. Once the transmitting apparatus has begun the transmission of information, the receiving apparatus must be capable of continuously accepting the information as it arrives. However, it is generally necessary for the receiving apparatus to perform tasks with the information as it is received, e.g., storing the information received for subsequent use, or performing various processing thereon. Consequently, the receiving apparatus must have sufficient time not only to handle the receipt of information, but also to perform associated tasks. If the time required for the associated tasks is greater than the time between groups of bits received, a problem results. In particular, the receiving apparatus must either discontinue the performance of the associated tasks to handle the receipt of additional information, or delay the handling of the receipt of additional information until the previous tasks have been completed. However, as information is typically arriving on a continuous basis, a delay in the handling of the receipt thereof could result in loss of such information. This problem has been addressed in the past in a number of ways.

One method which has been used to allow receiving apparatus greater time to process information has been in reducing the rate at which information is transmitted by the transmitting apparatus. While in principle this appears to be a simple and direct approach, practical considerations operate to limit the efficiency of such an approach. In particular, typical devices used for the transmission and receipt of information generally have a number of transmission rates which may be selected from. The transmission rates generally include a fundamental rate which is relatively slow. Other rates of transmission which are multiples of the fundamental rate are also available. By way of illustration, if a fundamental rate of 300 bits per second is available in such a device, other rates would typically include 600, 1200, 2400, 4800 and 9600 bits per second. Consequently when it is desirable to reduce the rate of transmission, the available frequencies to choose from are somewhat limited. In addition, generally speaking, there is a considerable difference between the choice of transmission rates. Again by way of illustration, if there is insufficient time for receiving apparatus to process received information when information is transmitted to it at a rate of 9600 bits per second, the next available frequency is typically 4800 bits per second, i.e., half the previous transmission rate. This is a significant reduction in speed, and can result in the inefficient operation of receiving apparatus.

In a different approach, the frequency of the receiving and transmitting apparatus may be individually adjusted to any selected rate. However, this generally requires specialized equipment for both the transmitting and receiving apparatus, and further introduces a number of additional problems. In particular, there must exist a means of communicating a new frequency of transmission between the transmitting and receiving apparatus so that both may adjust accordingly. In addition, as any difference in frequencies between transmitting and receiving apparatus operates in a cumulative fashion to affect the sensing of transmitted information by the receiving apparatus as previously discussed, both the transmitting and receiving apparatus must be capable of adjusting to the newly selected frequency in a highly accurate manner. As a practical matter, such an approach is generally not economically feasible.

In an alternate approach, information is transferred between a transmitting and a receiving apparatus in blocks of preselected size, e.g., 1024 8-bit characters. In particular, a transmitting apparatus transmits a first block of characters, and at the conclusion of such transmission appends a preselected control character to the end thereof, e.g., the ASCII character ETX. The appended character serves to indicate to the receiving apparatus the end of a block of information. Thereafter, when the receiving apparatus is ready to receive the next block of information, the receiving apparatus indicates such to the transmitting apparatus by a sending a preselected control character to the transmitting apparatus, e.g., the ASCII character ACK. Consequently, by grouping information into blocks of a preselected size and using associated control characters, some control over the rate at which information is transferred between a transmitting and receiving apparatus may be achieved. However, in the foregoing described process, it is observed that once transmission of a block of characters has begun, the transfer proceeds at the full rate of channel communication. In particular, the receiving apparatus cannot suspend a transfer once it has begun, and must be capable of continuously receiving all of the characters in the block.

In yet another alternate approach, the receiving apparatus may request the transmitting apparatus to temporarily suspend transmission of information at any point during a transmission process. In the ASCII protocol, two special characters are typically employed to accomplish this function, i.e., DC1 and DC3. In particular, when receiving apparatus is becoming busy and is having difficulty in keeping up with newly received information, the receiving apparatus may request the transmitting apparatus to suspend further transmission of information by transmitting the ASCII character of DC3 to the transmitting apparatus. Upon receipt of the DC3 character, the transmitting apparatus will suspend further transmission of information. When the receiving apparatus is again ready to receive further characters, it may request the resumption of the transmission of information by sending the transmitting apparatus the ASCII character of DC1.

While such an approach has been widely used in the past, there are a number of problems associated therewith. In particular, it is necessary that the communications channel be capable of supporting simultaneous transmission in both directions between the transmitting and receiving apparatus. In addition, a finite amount of time is required to effect the suspension of transmission, i.e., between the issuing of the DC3 character by the receiving apparatus, and the suspension of the transmission by the transmitting apparatus. Consequently, such a technique does not effect the immediate suspension of transmission. In addition, the receiving and transmitting apparatus must be capable of performing such tasks simultaneously with the information exchange process. While such an approach does have the advantage of not requiring a change in the frequency of transmission, it nevertheless does have a number of potential problems associated therewith.

In still another alternate approach, control signals may be associated with the information channel to provide control over the transmission of information. By way of illustration, in the RS-232 standard, there are a number of control signals associated with a communication channel, including Request to Send, Clear to Send, Data Set Ready, Data Terminal Ready and Carrier Detect. While these control signals may be used in a wide variety of ways to provide effective control over the transmission of information, such an approach generally further complicates the transmission process, as well as requiring additional hardware which can have an undesirable impact on price sensitive designs.

There is consequently a need for a method and apparatus which provides direct control over the rate at which information is transmitted over a serial communication channel. It is particularly desirable to have the ability to exercise said control without the necessity of changing transmission frequencies, i.e., baud rates, employing preselected control codes, or using dedicated hardware apparatus to generate associated control signals. In addition, it is further desirable to have the capability of exercising said control over a wide range of effective transmission rates.

SUMMARY OF THE INVENTION

In accordance with the present invention, a method and apparatus are disclosed which provides for controlling the rate of transmission of information over a serial communications channel. In accordance with the method of the present invention, the length of a stop bit is adjusted to provide a desired delay between groups of bits transmitted. In particular, as each group of bits comprising a unit of information is transmitted, a start bit is first transmitted to indicate to the receiving apparatus that transmission of a group of bits has commenced. The start bit is thereafter followed by the sequential transmission of each of the bits which comprise the unit of information. Following the transmission of the last bit of the unit of information, a selected number of stop bits are transmitted. The number of stop bits which are transmitted is determined by the desired delay between transmission of units of information, i.e., a desired effective rate of transmission between the transmitting and receiving apparatus. In accordance with the present invention, the actual rate of transmission, i.e., the time for transmission for each bit of information over the communications channel, remains constant, with a time interval of a selected duration occurring between successive groups of bits, i.e., units of information. Consequently, while the actual rate of transmission of bits of information, e.g., start bits, data bits and stop bits, in the communications channel remains constant, the effective transmission rate, i.e., the rate at which units of information are transmitted, may be varied in accordance with a selected effective channel transmission rate. Such a method consequently dispenses with the necessity of changing the communications rate of the channel, e.g., baud rate, to effect a desired rate of transmission of units of information between a transmitting and receiving apparatus. In particular, the transmission rate of the channel may remain fixed, and a selected effective transmission rate may be obtained by the insertion of a corresponding number of stop bits.

Transmission apparatus in accordance with the present invention includes memory to provide for the temporary storage of units of information to be transmitted, shift register to provide for the serial transmission of information, variable stop bit generation apparatus to produce a desired number of stop bits and control apparatus to orchestrate overall control functions. Broadly stated, the apparatus operates to first receive information regarding a transmission rate and a desired transmission rate for the channel. The transmission rate information is used to determine a rate at which the shift register transmits bits to an associated serial communication channel. The desired transmission rate is used to determine a required number of stop bits to be produced by the variable stop bit generation apparatus. Thereafter, the apparatus operates to receive a group of bits comprising a unit of information into the memory, and thereafter perform the transmission of same, followed by the transmission of a selected number of stop bits. In particular, a start bit is first transmitted to the receiving apparatus by the shift register, followed sequentially by bits of information which comprise the unit of information, and finally by the selected number of stop bits. Subsequent to the transmission of the start bit by the shift register, a subsequent unit of information may be transferred to the memory to await transfer to the shift register, following completion of transmission of the aforedescribed stop bits.

In an alternate embodiment of the present invention, a time period is specified for the transmission of each unit of information, the specified time period being greater than a time period necessary to transmit a unit of information. In accordance with the method and apparatus of the present invention, a subsequent unit of information may not be transmitted prior to the expiration of the specified time period. Subsequent to the completion of the transmission of the unit of information but prior to the expiration of the specified time period, the communication channel is maintained in a constant, selected condition, e.g., a marking state.

DESCRIPTION OF THE FIGURES

FIG. 1 is a block diagram that illustrates operational features of a shift register in accordance with the present invention.

FIG. 2 is a block diagram that illustrates functional apparatus in accordance with the present invention.

FIG. 9 is a timing diagram that illustrates a sequence of events in the operation of the apparatus of FIGS. 5, 6, 7 and 8.

DETAILED DESCRIPTION OF THE PREFERRED EMBODIMENT

Figure 3:
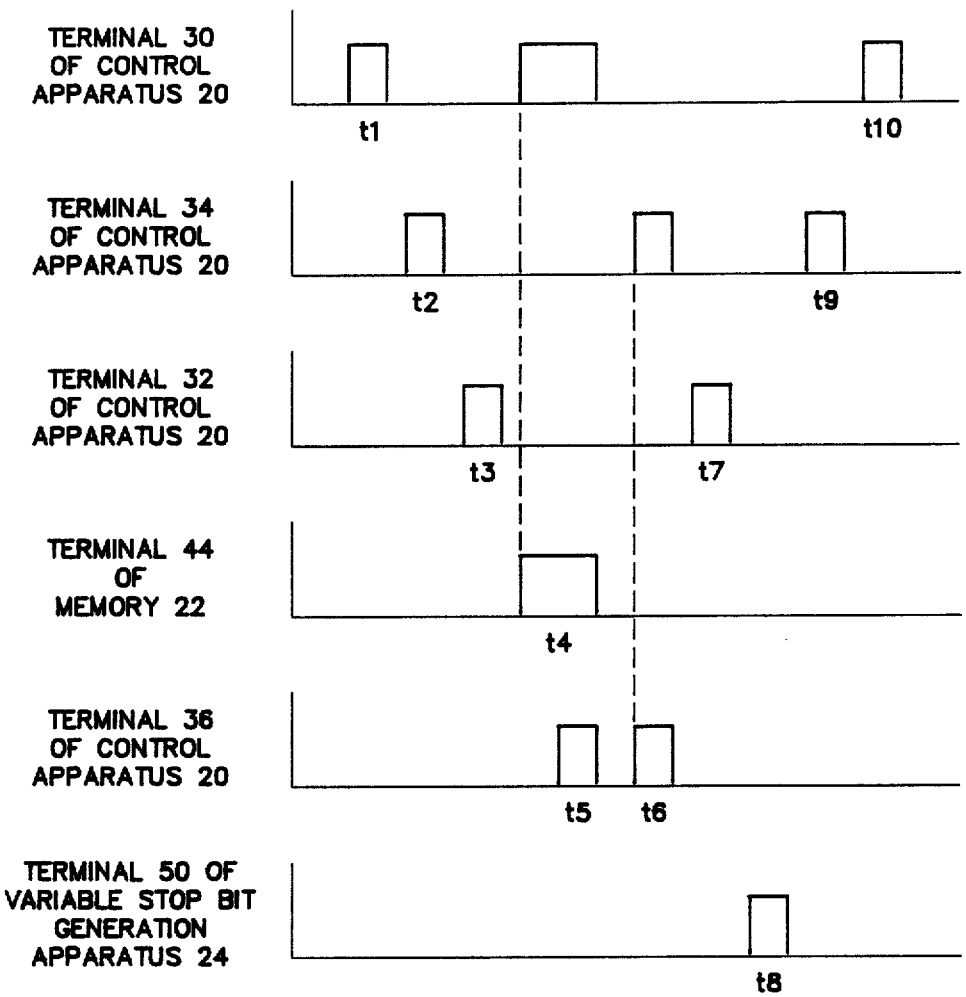
FIG. 3 is a timing diagram that illustrates a sequence of events in the operation of the apparatus of FIG. 2.

The present invention includes a method and apparatus for the serial transmission of information at an effective channel bit transmission rate independent of an actual channel bit transmission rate.

Broadly stated, in the present invention a unit of information comprised of a plurality of bits is transmitted in the following manner. A start bit is first transmitted, followed by the sequential transmission of each of the bits comprising the unit of information. Subsequent to the transmission of the last bit of the unit of information, a plurality of stop bits are transmitted. The number of stop bits transmitted is determined by the amount of idle time desired between successive units of information.

The foregoing is functionally illustrated in FIG. 1. Referring now to FIG. 1, Shift Register 10 is comprised of a plurality of locations for the storage of individual bits, including a Start Bit location 12, Data Bits location 14 and Stop Bits location 16. Start Bit location 12 operates to temporarily store a start bit. Data Bit location 14 functions to temporarily store a plurality of bits which collectively define a unit of information. Stop Bits location 16 functions to temporarily store a plurality of stop bits, as more fully discussed hereafter. In operation, information is first coupled to each of Start Bit location 12, Data Bits location 14 and Stop Bits location 16. Thereafter, Shift Register 10 functions to couple each of said bits in a sequential fashion to an associated serial communication channel (not illustrated). In particular, the bit of information previously stored in Start Bit location 12 is first coupled to the serial communication channel, sequentially followed thereafter by each of the bits previously stored in Data Bits location 14. Thereafter, the bits stored in Stop Bits location 16 are coupled to the serial communication channel. In accordance with the method and apparatus of the present invention, the number of stop bits which are stored in Stop Bits location 16 may be adjusted as more fully discussed hereafter. Following the transmission of the last stop bit stored in Stop Bits location 16, information is again stored in each of the storage locations of Shift Register 10. In particular, a start bit is coupled to Start Bit location 12, the bits comprising the next unit of information to be transmitted are coupled to Data Bits location 14, and the desired number of stop bits are coupled to Stop Bits location 16. Thereafter the foregoing process repeats. It will be observed with respect to the foregoing that the amount of time between transmission of successive units of information as stored in Data Bits location 14 is determined by the number of stop bits which are stored in Stop Bits location 16, and subsequently coupled to the serial communication channel for transmission. Consequently the effective rate at which information is transmitted by the serial communication channel may be easily varied by changing the number of stop bits which are coupled to Stop Bits location 16.

By way of illustration of the foregoing, a channel transmission rate of 38.4 Kilobaud provides a transmission time of approximately 26 microseconds for the transmission of each bit. If a total of 256 stop bits were stored in Stop Bits location 16 for transmission with each unit of information as stored in Data Bits location 14, i.e., 256 stop bits were transmitted between successive units of information, this would provide a delay of approximately 6.66 milliseconds, or an effective baud rate of approximately 150 baud. By decreasing the number of stop bits which are stored in Stop Bits location 16 and consequently the number of stop bits which are transmitted between successive units of information, the effective channel transmission rate may be correspondingly increased.

In the method of the present invention, the number of stop bits which are appended to the end of each unit of information which is transmitted may be quantitatively determined in the following manner. Assuming $F_t$ = actual channel bit transmission rate, (1)

$N_b$ = number of bits per unit of information, (2) and $F_d$ = effective channel bit transmission rate, (3)

the time to transmit a unit of information at an effective channel bit transmission rate of $F_d$ is given by $$N_b/F_d. \qquad (4)$$

The time to transmit a unit of information at an actual channel bit transmission rate of $F_t$, assuming one start bit, is given by $$(N_b+1)/F_t. \qquad (5)$$

The time period during which the communications channel is to be in an idle state between transmission of units of information is given by $$(N_b/F_d)-(N_b+1)(1/F_t). \qquad (6)$$

From the foregoing, the number of stop bits necessary at a channel transmission rate of $F_t$ to achieve an effective channel transmission rate of $F_d$ is given by $$[(N_b/F_d)-(N_b+1)(1/F_t)]/(1/F_t) \qquad (7)$$

By way of illustration of the foregoing, assuming a channel transmission rate of 9600 baud, i.e., $F_t = 9600$, a unit of information comprised of 8 bits, i.e., $N_b = 8$, and an effective channel transmission rate of 1200 baud, i.e., $F_d = 1200$, the time required to transmit 8 bits at 1200 baud is given by equation (4), and is approximately 6.67 milliseconds. The time to transmit 8 bits plus the required start bit at 9600 baud is given by equation (5), and is approximately 0.9375 milliseconds. The time period during which the transmission channel is to be in an idle state between transmission of units of information is approximately 5.729 milliseconds, as given by equation (6). Consequently, according to equation (7), a total of 55 stop bits would be required to be sent between units of information transmitted at a channel transmission rate of 9600 baud to achieve an effective channel transmission rate of 1200 baud.

One embodiment of the present invention is broadly illustrated in FIG. 2. Referring to FIG. 2, Control Apparatus 20 has terminals 30, 32, 34, 36 and 38 associated therewith, and responsive to information coupled to terminal 30 thereof functions to orchestrate the operations of Memory 22, Shift Register 10 and Variable Stop Bit Generation Apparatus 24, as more fully discussed hereafter. Control Apparatus 20 further provides control signals to an associated serial communication channel (not illustrated) by information coupled to terminal 38 thereof, and to associated information processing apparatus by information coupled to terminal 30 thereof.

Memory 22 has terminals 42, 44 and 46 associated therewith, and functions responsive to units of information coupled to terminal 44 from associated information processing apparatus (not illustrated), and control information coupled to terminal 42, to provide for the temporary storage of units of information coupled thereto. Memory 22 further operates, responsive to control information coupled thereto on terminal 42, to place the information stored therein on terminal 46, as more fully discussed hereafter.

Variable Stop Bit Generation Apparatus 24 has terminals 48 and 50 associated therewith, and functions responsive to control information coupled to terminal 48 to produce stop bits of selected length at terminal 50 thereof.

Shift Register 10 has terminals 52, 54, 56 and 58 associated therewith, and operates in response to control information coupled to terminal 52, units of information coupled to terminal 54 and stop bit information coupled to terminal 56 to provide for the serial transmission of information from terminal 58 to an associated serial communication channel.

The foregoing described apparatus is configured in the following manner. Units of information which are desired to be transmitted over the serial communication channel are coupled from associated information processing apparatus to Memory 22 via terminal 44. Control information from the associated information processing apparatus is coupled to Control Apparatus 20 at terminal 30. Control information from terminals 32, 34, and 36 of Control Apparatus 20 is coupled to terminals 48, 52 and 42 of Variable Stop Bit Generation Apparatus 24, Shift Register 10 and Memory 22, respectively. Control information from terminal 38 of Control Apparatus 20 is coupled to the associated serial communication channel. Terminal 46 of Memory 22 is coupled to terminal 54 of Shift Register 10. Terminal 50 of Variable Stop Bit Generation Apparatus 24 is coupled to terminal 56 of Shift Register 10. Terminal 58 of Shift Register 10 is coupled to the associated serial transmission channel.

FIG. 3 is a timing diagram which illustrates the sequence of events in the operation of the functional apparatus of FIG. 2. Referring now to FIGS. 2 and 3, the foregoing described apparatus of FIG. 2 operates in the following manner. Initial operational information defining an actual channel bit transmission rate and an effective channel bit transmission rate is first coupled from the associated information processing apparatus to Control Apparatus 20 at terminal 30 at time t1. The actual channel bit transmission rate serves to define a time period for the transmission of each bit contained within a unit of information. The effective channel bit transmission rate serves to define the amount of time the serial transmission channel will be held in an idle condition between transmission of sequential units of information, i.e., number of stop bits which will be necessary between sequentially transmitted units of information. Control Apparatus 20 couples the channel transmission rate information from terminal 34 thereof to terminal 52 of Shift Register 10 at time t2. Shift Register 10, responsive to the actual channel bit transmission rate information, subsequently operates to couple information to the associated serial transmission channel at the actual channel bit transmission rate. The effective channel bit transmission rate information is coupled from terminal 32 of Control Apparatus 20 to terminal 48 of Variable Stop Bit Generation Apparatus 24 at time t3, and serves to define the number of stop bits which will be produced by Variable Stop Bit Generation Apparatus 24.

Thereafter, the associated information processing apparatus couples a first unit of information to terminal 44 of Memory 22, and corresponding control information to terminal 30 of Control Apparatus 20 at time t4, indicating the presence of the first unit of information on terminal 44 of Memory 22. Control Apparatus 20, responsive to the information coupled to terminal 30 thereof indicating the presence of a unit of information on terminal 44 of Memory 22, couples control information from terminal 36 thereof to terminal 42 of Memory 22 at time t5 to effect the temporary storage of the unit of information by Memory 22. Control Apparatus 20 thereafter effects the transfer of the unit of information previously stored in Memory 22 to Shift Register 10 by control signals from terminals 36 and 34 thereof coupled to terminals 42 and 52 of Memory 22 and Shift Register 10, respectively, at time t6. Variable Stop Bit Generation Apparatus 24, responsive to control information coupled at time t7 from terminal 32 of Control Apparatus 20 to terminal 48 thereof, determines the necessary number of stop bits. Information defining the necessary number of stop bits is thereafter coupled at time t8 from terminal 50 of Variable Stop Bit Generation Apparatus to terminal 56 of Shift Register 10. Thereafter, responsive to information from terminal 34 of Control Apparatus 20 at time t9, Shift Register 10 transmits a start bit, the bits comprising the first unit of information, followed by the necessary number of stop bits. Subsequent to the transfer of the unit of information from Memory 22 to Shift Register 10, Control Apparatus 20 couples information to the associated information processing apparatus by information coupled to terminal 30 thereof at time t10 indicating that the next unit of information may be coupled to terminal 44 of Memory 22. The associated information storage apparatus may thereafter place the next unit of information to be transmitted on the serial communication channel on terminal 44 of Memory 22, as previously discussed. The foregoing described process will then repeat for each subsequent unit of information which is desired to be transmitted over the serial communication channel.

The present invention further includes the production of fractional portions of stop bits. In particular, the amount of time during which the transmission channel is held in the idle state may be any selected period of time, and is not restricted to integer multiples of stop bits.

It will be understood that as the purpose of a stop bit is to ensure the return of a serial communication channel to an idle state, e.g., a marking state, Variable Stop Bit Generation Apparatus 24 functions to produce a minimum number of required stop bits to effect the effective channel bit transmission rate. If the associated information processing apparatus does not couple subsequent units of information to Memory 22 prior to the transmission of the preceding information and associated start and stop bits, Shift Register 10 will continue to maintain the serial communication channel in the required idle, e.g., marking, state.

The manner in which each of functional blocks 10, 20, 22 and 24 of FIG. 2 could be implemented would be apparent to one of ordinary skill in the art.

Figure 4:
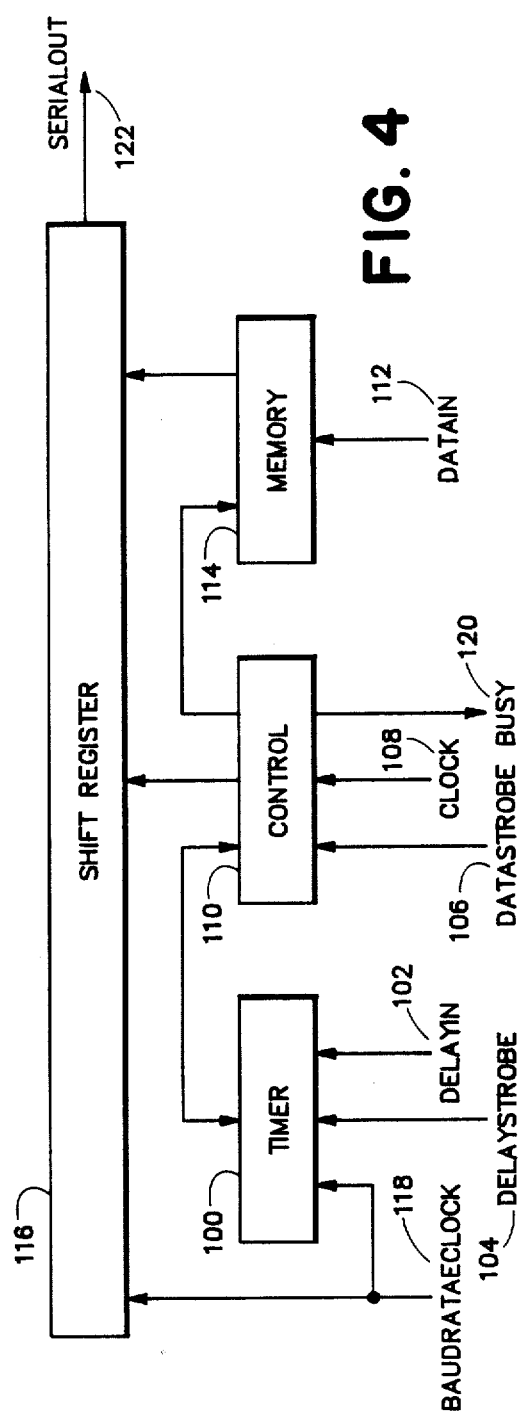
FIG. 4 is a block diagram which illustrates functional apparatus in accordance with an alternate embodiment of the present invention.

FIG. 4 illustrates functional apparatus in accordance with an alternate embodiment of the present invention. The functional apparatus of FIG. 4 provides for the serial transmission of units of information to an associated communication channel (not illustrated) at a selected transmission rate, with a selected time period occurring between the transmission of successive units of information. Referring to FIG. 4, a number representative of a selected time interval which is to occur between the transmission of successive units of information is first coupled to Timer 100 from DELAYIN 102, coincident with the occurrence of DELAYSTROBE 104. The selected time interval serves to define a time period between the transmission of subsequent units of information. Thereafter, responsive to a signal from DATASTROBE 106 and a repetitive clock signal from CLOCK 108, Control 110 effects the storage of a unit of information from DATAIN 112 in Memory 114. Thereafter, responsive to control information from Control 110, the unit of information is coupled to Shift Register 116 for serial transmission to an associated serial communication channel (not illustrated) by SERIALOUT 122, in accordance with a transmission rate determined by BAUDRATECLOCK 118. During the serial transmission of the unit of information, Timer 100 functions to modify the number previously coupled thereto at a rate determined by BAUDRATECLOCK 118. In addition, Control 110 produces an indication on BUSY 120 that subsequent units of information may not be coupled to the functional apparatus of FIG. 4. Subsequent to the number modified by Timer 100 becoming equal to a predetermined value, Control 110 produces an indication on BUSY 120 that a subsequent unit of information may be coupled to the functional apparatus of FIG. 4.

It is to be understood that DELAYIN 102, DELAYSTROBE 104, DATASTROBE 106, CLOCK 108, DATAIN 112, BAUDRATECLOCK 118 AND BUSY 120 are signals between the apparatus of FIG. 4 and associated apparatus (not illustrated), and SERIALOUT 122 is a signal between the apparatus of FIG. 4 and an associated communication channel (not illustrated).

Figure 5:
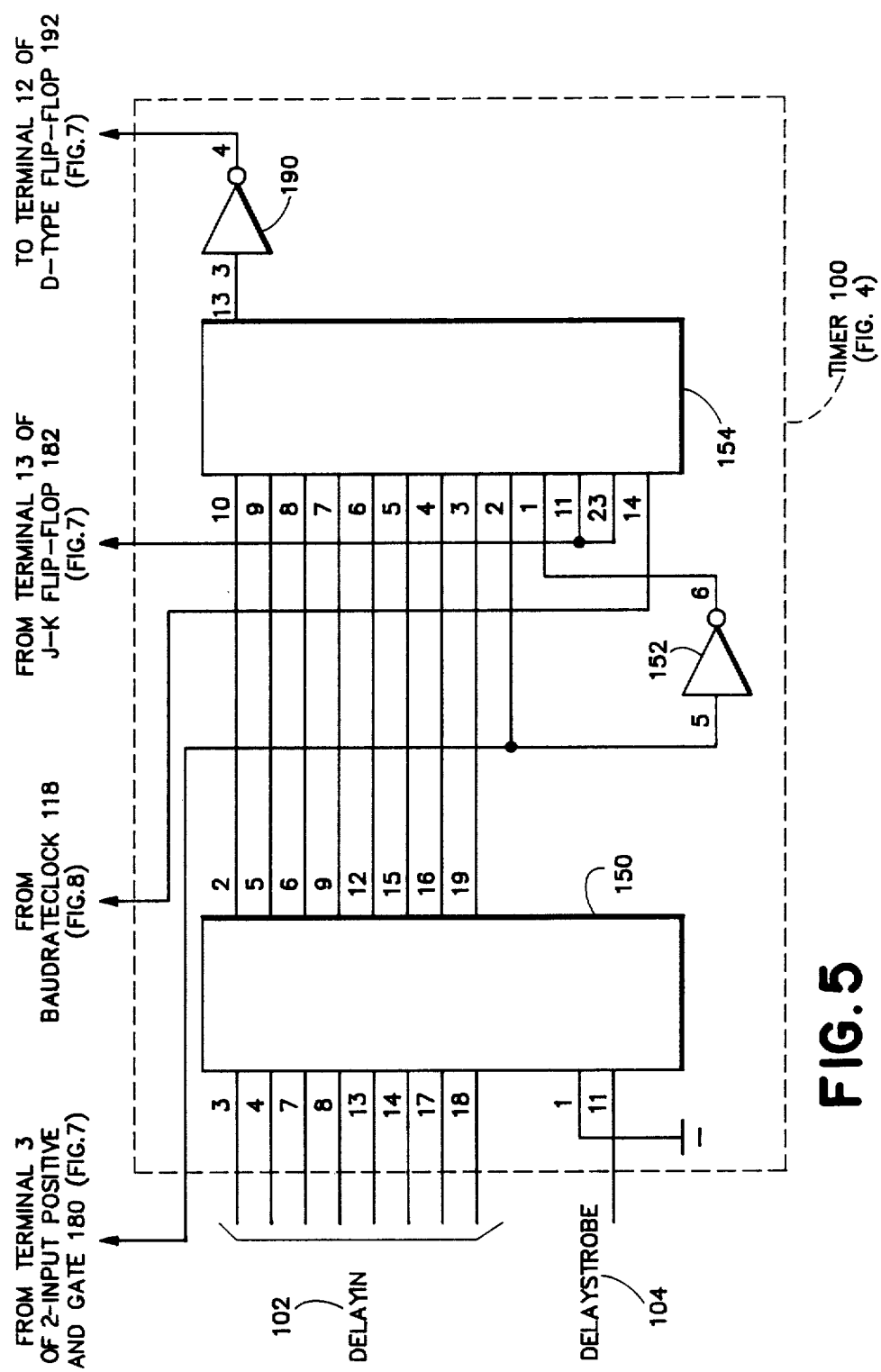
FIG. 5 illustrates an implementation for Timer 100 of FIG. 4.

FIG. 5 illustrates an implementation of Timer 100 (FIG. 4). Referring now to FIG. 5, the number representative of the selected time interval which is to occur between the the transmission of successive units of information is first placed on DELAYIN 102 at time t10 (FIG. 9), and coupled to Octal D-Type Flip-Flop 150 upon a low-to-high transition of DELAYSTROBE 104 at time t11, as more fully discussed hereafter. Octal D-Type Flip-Flop 150 provides for the storage of the selected time interval, and may be implemented by a Model 74LS374 Integrated Circuit manufactured by Texas Instruments of Dallas Tex. Thereafter, the selected time interval is transferred to Synchronous 8-Bit Up/Down Counter 154 as more fully discussed hereafter. Synchronous 8-bit Up/Down Counter 154 may be implemented by a Model 74AS867 Integrated Circuit manufactured by Texas Instruments.

Figure 6:
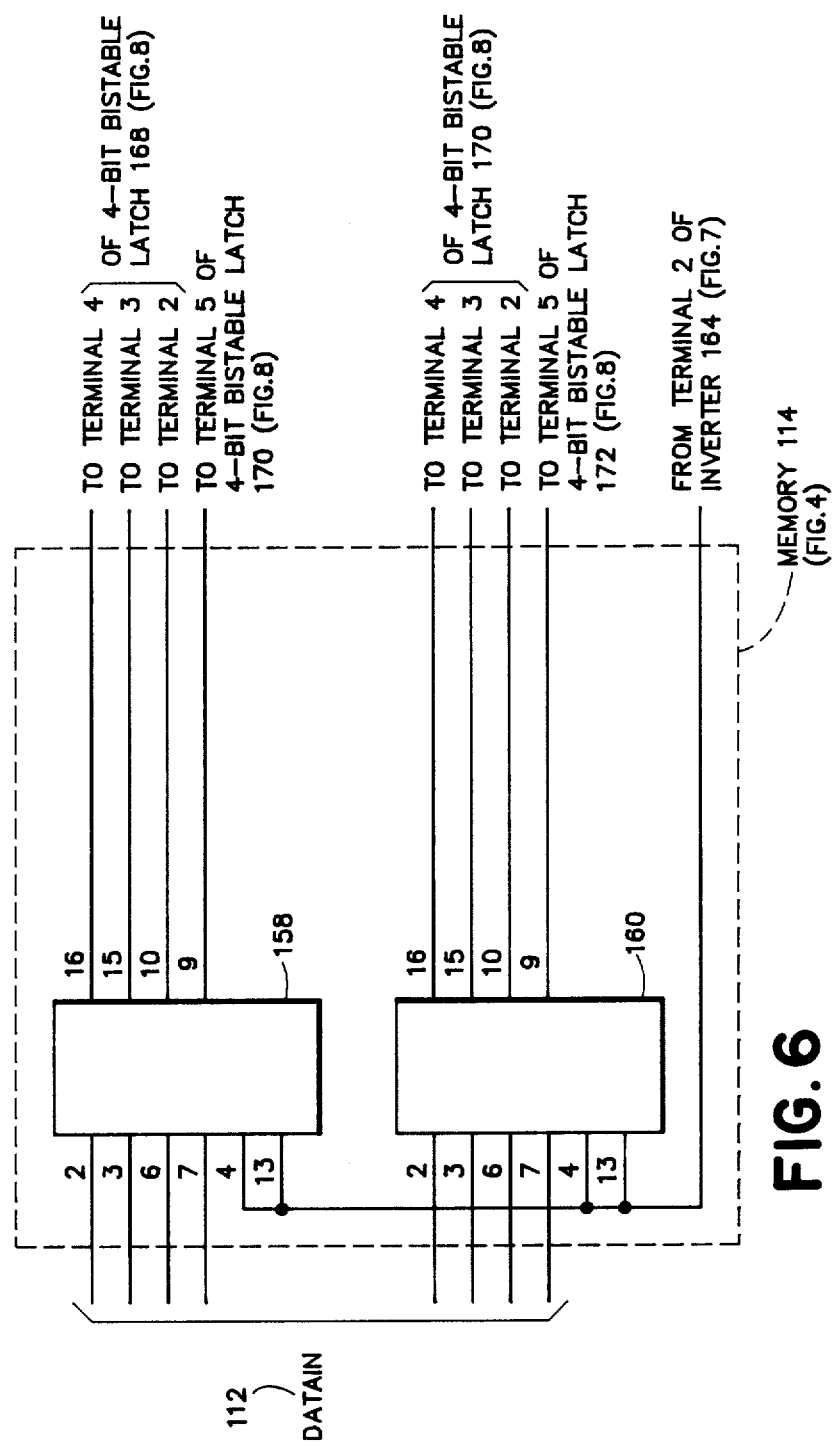
FIG. 6 illustrates an implementation for Memory 114 of FIG. 4.

FIG. 6 illustrates an implementation for Memory 114 (FIG. 4). Referring now to FIGS. 6 and 9, a unit of information is placed on DATAIN 112 at time t12, and an indication thereof is placed on DATASTROBE 106 at time t13. DATASTROBE 106 is coupled to terminals 4 and 132 of 4-Bit Bistable Latches 158 and 160 through Inverter 164 (FIG. 7), and operates to effect the storage of the unit of information present on DATAIN 112 by 4-Bit Bistable latches 158 and 160, as more fully discussed hereafter. 4-Bit Bistable Latches 158 and 160 may be implemented by Model 7475 Integrated Circuit manufactured by Texas Instruments.

Figure 7:
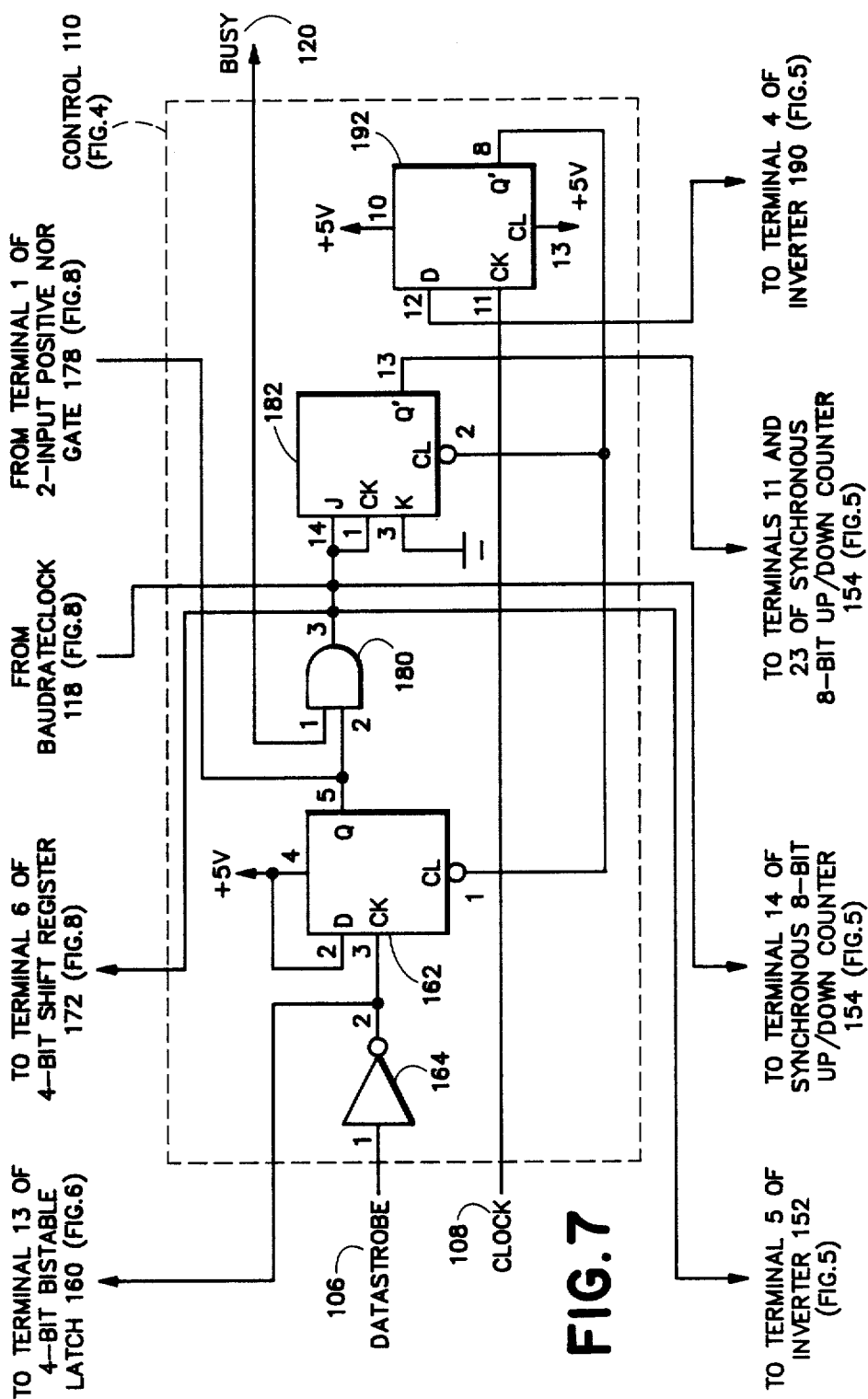
FIG. 7 illustrates an implementation for Control 110 of FIG. 4.

FIG. 7 illustrates an implementation for Control 110 (FIG. 4). Referring now to FIGS. 7 and 9, subsequent to the occurrence of a high-to-low transition on DATASTROBE 106 at time t13, Control 106 produces a signal on BUSY 120 at time t13 indicating subsequent units of information may not be coupled to Memory 114 (FIG. 4). In particular, a high-to-low transition on DATASTROBE 106, when coupled to the Ck terminal of D-Type Flip-Flop 162 (FIG. 7) through Inverter 164, operates to place the signal on Q output terminal thereof in a logic one state, and consequently BUSY 120 in an active state. DATASTROBE 106 must be synchronous to BAUDRATECLOCK 118 to assure proper operation. It is consequently observed that as a result of the occurrence of DATASTROBE 106, BUSY 120 is in a state indicating that subsequent units of information may not be coupled to Memory 114 (FIGS. 4 and 6). In addition, the occurrence of DATASTROBE 106 operates to couple a unit of information present on DATAIN 112 into Memory 114 (FIG. 4), i.e., into 4-Bit Bistable Latches 158 and 160 (FIG. 6), as previously discussed.

Figure 8:
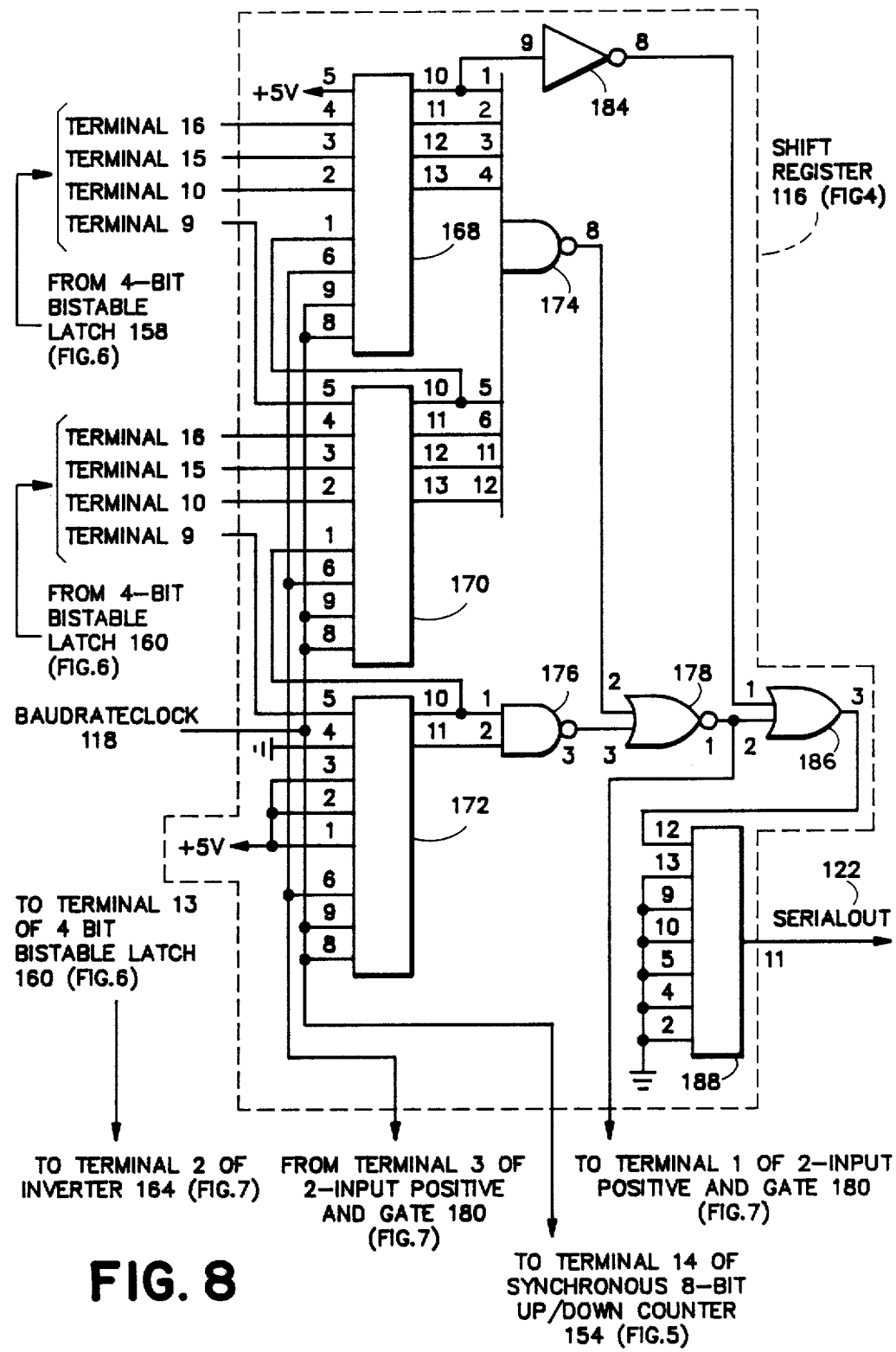
FIG. 8 illustrates an implementation for Shift Register 116 of FIG. 4.

FIG. 8 illustrates an implementation for Shift Register 116 (FIG. 4). Referring now to FIG. 8, 4-Bit Shift Registers 168, 170 and 172 provide for the serial coupling of information placed therein to SERIALOUT 122, as more fully discussed hereafter. Each of 4-Bit Shift Register 168, 170 and 172 may be implemented by a Model 7495A Integrated Circuit Manufactured by Texas Instruments. The absence of information within 4-Bit Shift Registers 168, 170 and 172 is detected by 8-input Positive NAND Gate 174, 2-input Positive NAND Gate 176 and 2-input Positive NOR Gate 178. In particular, a logic one state present at the output terminal of 2-input Positive NOR Gate 178 indicates the absence of data within 4-Bit Shift Registers 168, 170 and 172.

Referring once again to the implementation of Control 110 (FIG. 4) illustrated in FIG. 7, the previously described logic one state from the output terminal of 2-input Positive NOR Gate 178 (FIG. 8) together with the previously described logic one from the Q terminal of D-Type Flip-Flop 162 operates to produce a logic one state at the output terminal of 2-input Positive AND Gate 180. A logic one state at the output terminal of 2-input AND Gate 180 operates to transfer the unit of information previously loaded into 4-Bit Bistable Latches 158 and 160 (FIG. 6) into 4-Bit Shift Registers 168, 170 and 172 (FIG. 8), to transfer the previously described selected time interval from Octal D-Type Flip-Flop 150 (FIG. 5) into Synchronous 8-Bit Up/Down Counter 154 (FIG. 5) and to subsequently enable the operation thereof. In particular, the transition to a logic one state at the output terminal of 2-input AND Gate 180 (FIG. 7) when coupled to terminals 6 of each of 4-Bit Shift Registers 168, 170 and 172 (FIG. 8) operates to transfer the contents of 4-Bit Bistable Latch 158 and 160 (FIG. 6) therein. In addition, the coupling of the logic one state of 2-input AND Gate 180 to terminal 2 of Synchronous 8-Bit Up/Down Counter 154 (FIG. 5), and a corresponding logic zero through a logical inversion operation performed by Inverter 152 to pin 1 of Synchronous 8-Bit Up/Down Counter 154, operates to transfer the contents of Octal D-Type Flip-Flop 150, i.e., the selected time interval, into Synchronous 8-Bit Up/Down Counter 154. With the transfer of a unit of information from 4-Bit Bistable Latches 158 and 160 (FIG. 6) into 4-Bit Shift Registers 168, 170 and 172 (FIG. 8), the previously described output terminal of 2-input Positive NOR Gate 178 (FIG. 8) will assume a logic zero state, thereby effecting a change in the output terminal of 2-input Positive AND Gate 180 (FIG. 7) to a logic zero. The transition in the output terminal of 2-input Positive AND Gate 180 from a logic one to a logic zero state effects the setting of J-K Flip-Flop 182 (FIG. 7), thereby enabling a counting function by Synchronous 8-Bit Up/Down Counter 154, by the coupling of a logic one state from terminal 13 of D-Type Flip-Flop 182 to terminals 11 and 23 of Synchronous 8-Bit Up/Down Counter 154 (FIG. 5).

Thereafter, the information transferred into 4-Bit Shift Registers 168, 170 and 172 (FIG. 8) is coupled to SERIALOUT 122 through Inverter 184, 2-input Positive NOR Gate 186 and Level Converter 188. As BAUDRATECLOCK 118 (FIG. 4) is coupled to terminals 8 and 9 of each of 4-Bit Shift Registers 168, 170 and 172 (FIG. 8), the rate at which information is transmitted on SERIALOUT 122 is determined by the frequency of BAUDRATECLOCK 118. Level Inverter 188 operates to perform a voltage level translation operation, and may be implemented by a Model 1488A Integrated Circuit manufactured by National Semiconductor, Inc. of Santa Clara, Calif. In addition, as BAUDRATECLOCK 118 is likewise coupled to terminal 14 of Synchronous 8-Bit Up/Down Counter 154 (FIG. 5), the frequency at which Synchronous 8-Bit Up/Down Counter 154 operates is determined by the frequency of BAUDRATECLOCK 118.

When the contents of 4-Bit Shift Registers 168, 170 and 172 (FIG. 8) have been serially transmitted on SERIALOUT 122 as previously described, the output terminal of 2-input Positive NOR Gate 178 will again return to a logic one condition at time t14 (FIG. 9), indicating the completion of transmission of the contents of 4-Bit Shift Registers 168, 170 and 172 (FIG. 8). However, BUSY 120 (FIGS. 7 and 9) will remain in an active, i.e., a logic one state, until the foregoing described counting operation is completed by Synchronous 8-Bit Up/Down Counter 154 (FIG. 5). In particular, when Synchronous 8-Bit Up/Down Counter 154 has completed counting from the value initially stored therein to a value of zero, an indication is generated thereof by a transition from a logic one to a logic zero state on terminal 13 thereof at time t15, which, when coupled through Inverter 190 (FIG. 5) operates to place terminal 8 of D-Type Flip-Flop 192 (FIG. 7) in a logic zero state, thereby effecting the clearing of D-Type Flip-Flop 162 (FIG. 7) and J-K Flip-flop 182. The clearing of D-Type Flip-Flop 162 operates to place BUSY 120 in a logic zero state (FIG. 7 and 9), thereby indicating that a subsequent unit of information may be coupled to Memory 114 (FIGS. 4 and 6). BAUDRATECLOCK 118 must be synchronous to CLOCK 108 (FIGS. 4 and 7) to assure proper operation. CLOCK 108 functions to provide a continuous clock signal to Ck terminal of D-Type Flip Flop 192, and in the embodiment illustrated in FIG. 7 operates at a frequency of 4.9 MHz.

It should be observed from the foregoing that the selected time period coupled to Octal D-Type Flip-Flop 150 (FIG. 5) by DELAYIN 102 with the occurrence of DELAYSTROBE 104 operates to define a time period in which information coupled to 4-Bit Bistable Latch 158 and 160 (FIG. 6) by DATAIN 112 will be transmitted, at a rate determined by the frequency of BAUDRATECLOCK 118. In particular, the rate at which information previously coupled to 4-Bit Bistable Latches 158 and 160 is transmitted by SERIALOUT 122 remains constant at a frequency determined by BAUDRATECLOCK 118. However, as BAUDRATECLOCK 118 also determines the rate at which Synchronous 8-bit Up/Down Counter 154 (FIG. 5) operates, the effective rate at which information is transmitted is determined by the selected time period coupled thereto, i.e., by DELAYIN 102. Referring to FIG. 9, while the actual time required to transmit a character by the foregoing described apparatus remains constant, i.e., t14—t13, the effective time to do so, i.e., t15—t13 may be varied according to the selected time period coupled to Synchronous 8-Bit Up/Down Counter 154. Consequently, the effective rate of transmission of bits of information over the communication channel may be varied in accordance with a desired effective channel transmission rate, while the actual rate remains constant.

It should be further observed that while Synchronous 8-Bit Up/Down Counter 154 operates at a rate determined by BAUDRATECLOCK 118 in the foregoing described apparatus, that Synchronous 8-bit Up/Down Counter 154 may, in a similar manner, operate from an alternate frequency source synchronous with CLOCK 108, as would be apparent to one of ordinary skill in the art. In addition thereto, while Octal D-Type Flip-Flop 150 provides flexibility in defining a selected time period as above described, other similar arrangements could likewise be employed, including a manual selection of a time period, as would be apparent to one of ordinary skill in the art. In further addition thereto, it will be observed that while 4-Bit Bistable Latch 158 and 160 function to receive and store information for transmission on the serial communication channel, additional storage devices may be employed to provide for increased storage of information to be transmitted. The manner in which such additional storage devices would be implemented would be apparent to one of ordinary skill in the art.

Since changes and modifications of the invention will occur to and can be readily made by those skilled in the art without departing from the inventive concept, the foregoing description of the preferred embodiment is not to be taken as limited except by the scope of the appended claims.

I claim:

1. Apparatus for processing units of information each comprising a countable number of bits from an information source prior to transmission over an associated communication channel at the same bit rate as the bits of the unit of information before processing and at a selected effective information transmission rate, said apparatus comprising:

control means coupled to the information source for generating control information;

memory means coupled to the information source and responsive to the unit of information from said control means for providing temporary storage of a unit of information from the information source without changing the format of the bits of the unit of information;

variable stop bit generation means coupled to said control means for generating a selected number of stop bits to be added to each unit of information stored in the memory means so that the unit of information will be transmitted at the selected effective information transmission rate with each bit being transmitted at the same bit rate as the bits of the unit of information before processing; and shift means coupled to said memory means and variable stop bit generation means, and responsive to information from said control means, memory means and said variable stop bit generation means for coupling information serially from said memory means and the selected number of stop bits from said variable stop bit generation means to the associated communication channel at the same bit rate as the bits of the unit of information before processing and at a selected effective information transmission rate without changing the format of the bits of the units of information.

2. Apparatus as in claim 1, wherein said memory means further comprises means for storing a plurality of units of information from the information source.

3. Apparatus as in claim 1, wherein said control means further comprises means for generating and coupling control signals to the communication channel.

4. Apparatus as in claim 1, wherein said control means further comprises means for generating and coupling control signals to the information source.

5. Apparatus as in claim 1, wherein said variable stop bit generation means generates a number of stop bits responsive to information from said control means.

6. Apparatus as in claim 5, wherein said variable stop bit generation means further comprises apparatus for the generation of a number of stop bits greater than two.

7. Apparatus as in claim 5, wherein said variable stop bit generation means further comprises apparatus for the generation of a fractional number of stop bits.

8. Apparatus as in claim 5 wherein said variable stop bit generation means further comprises apparatus for the generation of a number of stop bits greater than two, including a fractional number of stop bits.

9. A method for processing a selected amount of information comprised of units of information, each unit of information being comprised of a plurality of binary bits, from an information source prior to transmission over a communication channel at the same bit rate as the bits of the unit of information before processing and at a selected effective information transmission rate, said method comprising the repetition of the following steps for each unit of information until the selected amount of information has been coupled to the communication channel;

coupling a unit of information from the information source to temporary storage apparatus without changing the format of the bits of the unit of information;

generating a selected number of stop bits to be added to the unit of information stored so that the unit of information will be transmitted at the selected effective information transmission rate with each bit being transmitted at the same bit rate as the bits of the unit of information before processing; and serially coupling a start bit, the plurality of binary bits comprising the unit of information, and the selected number of stop bits to the communication channel at the same bit rate as the bits of the unit of information before processing and at a selected effective information transmission rate without changing the format of the bits of the units of information.

10. Apparatus for processing units of information each comprising a countable number of bits from an information source prior to transmission over a communication channel at the same constant transmission bit rate as the bits of the unit of information before processing and at a selected effective information transmission rate, said apparatus comprising:

control means coupled to the information source for generating control information;

storage means coupled to the information source for storing the unit of information for transmission without changing the format of the bits of the units of information;

timing means coupled to said control means for producing a signal responsive to the selected effective information transmission rate with each bit having the same bit rate as the bits of the unit of information before processing; and, shift means coupled to said control means and to said storage means for coupling information from said storage means to the communication channel at the same bit rate as the bits of the unit of information before processing, and subsequent to the transmission of the information, for maintaining the communication channel in a selected state responsive to information from said timing means resulting in the units of information being transmitted at the selected effective information transmission rate without changing the format of the bits of the units of information.

11. Apparatus as in claim 10 wherein said storage means further comprises apparatus for the storage of a plurality of units of information for transmission.

12. Apparatus as in claim 10 wherein said control means further comprises activity indication means for producing a signal responsive to the coupling of information from the information source to the storage means, the signal having a duration responsive to the selected effective rate.

13. Apparatus as in claim 10 wherein said timing means further comprises storage means coupled to the information means for storing selected effective rate information.

14. A method for processing units of information each comprising a countable number of bits from an information source prior to transmission over a communication channel at the same constant transmission bit rate as the bits of the unit information before processing and at a selected effective information transmission rate, said method comprising the steps of:

storing units of information from the information source for transmission without changing the format of the bits of the units of information;

producing a timing signal in accordance with the selected effective information transmission rate with each bit having the same bit rate as the bits of the unit of information before processing upon the storing of information from the information source; and coupling the unit of information from the information source to the communication channel at the same bit rate as the bits of the unit of information before processing, and maintaining the communication channel in a selected state thereafter for a time period responsive to the timing signal resulting in the units of information being transmitted at the selected effective information transmission rate without changing the format of the bits of the units of information.

15. Apparatus for processing units of information, each comprising a countable number of bits, from an information source prior to transmission over a communication channel according to the constant transmission bit rate of the information source, a serial shift clock signal and an operating clock signal at the same constant transmission bit rate as the bits of the units of information before processing and at a selected effective information transmission rate, said apparatus comprising:

- control means responsive to the operating clock signal and coupled to the information source for generating control information;
- a first memory means coupled to said information source for storing units of information from the information source without changing the format of the bits of the units of information;
- a second memory means coupled to the information source and responsive to the constant transmission bit rate for storing the constant transmission bit rate information;
- timing means coupled to said control means and to said second memory means for producing a signal in accordance with the constant transmission bit rate information;
- serial shift means coupled to said first memory means and to said control means for coupling the units of information in said first memory means to the communication channel resulting in the units of information being transmitted at the selected effective information transmission rate without changing the format of the bits of the units of information or the constant transmission bit rate and producing an indication to said control means; and
- activity indicating means coupled to said control means and to said timing means for producing an indication to said information source responsive to the constant transmission bit rate information.

16. Apparatus as in claim 15 wherein said timing means further comprises means for producing a first indication responsive to the coupling of information from the information source to said first memory means and producing a second indication thereafter responsive to the rate information.

* * * * *